United States Patent Office 3,246,961
Patented Apr. 19, 1966

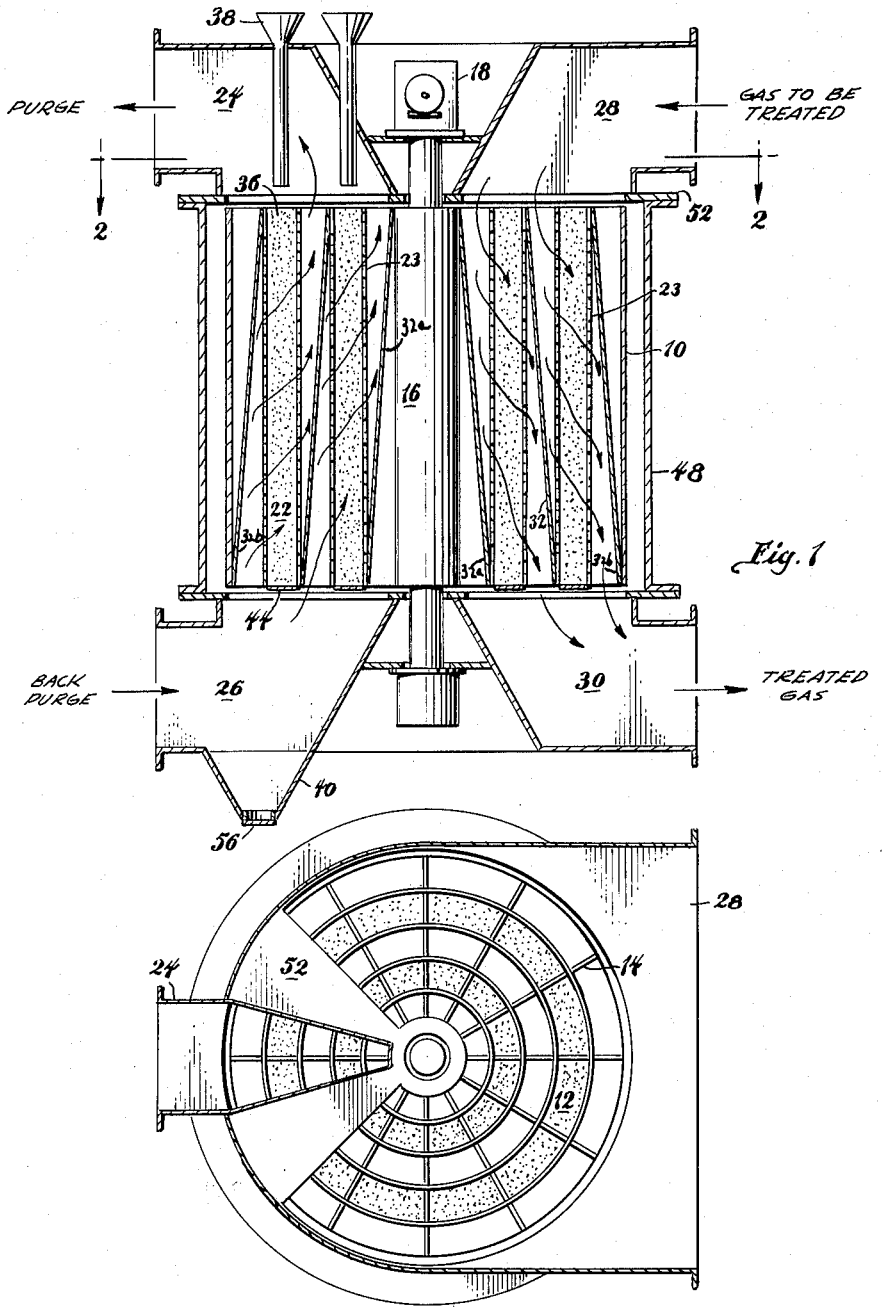

3,246,961
CATALYST CARRIER WITH BACK PURGE
Per Hilmer Karlsson, Dobbs Ferry, N.Y., assignor, by mesne assignments, to The Air Preheater Company, Inc., a corporation of Delaware
Filed Aug. 21, 1963, Ser. No. 303,579
4 Claims. (Cl. 23—288)

The present invention relates to an improved type of catalytic reactor having a compartmented rotor that carries a mass of catalytically active material which as the rotor turns alternately traverses spaced ducts through which flow a reaction fluid and a purging fluid. A catalytic reaction is effected when the catalytically active material is moved through one duct and thus brought into contact with the reaction fluid. Upon passing through the other duct carrying the purging fluid, the catalytically active material is purged of reaction products and deposits of foreign matter that result from the catalytic reaction.

In apparatus of the type here defined, a cylindrical rotor is preferably divided into sectorial compartments that carry a mass of catalytic material alternately between spaced ducts carrying the reaction fluid and the purging fluid. Upon contact with the catalytic material, a given reaction occurs within the reaction fluid and products of the reaction in addition to carbon and other foreign matter may be simultaneously deposited upon the catalyst so as to quickly decrease its catalytic activity and its overall efficiency. Unless the fouled catalytic mass is periodically regenerated or renewed, its utility is progressively reduced to an uneconomic level.

In accordance with the present invention, there is provided an arrangement by which a portion of the catalytic material carried in a rotary catalyst carrier may be continuously reactivated or even removed from and replaced into the carrier apparatus without interrupting the operation of the apparatus and the flow of reactant fluid therethrough.

A better understanding of the invention may be obtained upon consideration of the following detailed description of an illustrative embodiment thereof when read in conjunction with the accompanying drawings in which:

FIGURE 1 is a vertical section through the axis of rotation of a catalyst containing rotor, and FIGURE 2 is a horizontal section as seen from line 2—2 of FIGURE 1.

Referring particularly to FIGURE 1, the numeral 10 designates a cylindrical shell of a rotor divided into sector shaped compartments 12 by radial partitions 14 that connect the rotor shell 10 with a central rotor post 16. The rotor post and rotor assembly carried thereby is driven by a motor and gearing arrangement 18 that turns the rotor slowly about its axis to move the catalytic material 22 alternately between inlet and outlet ducts 28 and 30 for the reaction fluid or the gas to be treated by the catalyst and inlet and outlet ducts 24 and 26 for the purging fluid.

The sector shaped compartments 12 are each adapted to contain one or more banks of catalytic material. The catalytic material is contained in vertically disposed cells closed at their lower ends and having foraminous inner and outer walls 23 that permit the radial flow of fluid therethrough in order that fluids from ducts 26 and 28 may flow in continuous contact with the catalytic material contained in the cells. The lateral sides of the cells about the radial partitions 14 while the axially remote ends thereof lie substantially flush with the ends of the rotor so that all fluid from either duct must flow radially through the catalyst carrying cells.

In order that the reaction fluid and the purging fluid may be positively directed through the catalytic mass on each side of the apparatus with a minimum of turbulence and pressure loss, a series of flow directing baffles 32 are arranged diagonally between axially spaced ends of the catalyst cells that lie within each sectorial compartment of the rotor. The radially inner baffle 32a in each compartment is arranged to have one end thereof supported by the rotor post 16 while the radially outer baffle member 32b has its axially remote end thereof secured to the inner surface of the rotor housing 10 thereby making integral with the rotor shell and rotor post all intermediate catalytic cells.

A series of laterally adjacent catalytic cells are adapted to provide an essentially annular bank of catalytic material, part of which is continuously lying between the pair of ducts 28, 30 for the reaction fluid while a spaced portion of the annular bank of catalytic material lies intermediate the inlet and outlet ducts 26, 24 for the purging fluid. An end or sector plate 52 on the housing at each end of the rotor having a width somewhat greater than that of a sectorial compartment of the rotor maintains the fluids in their respective passageways. If desired, radial seals may be provided on the radial partitions 14 for contact with and circumferential seals on the ends of the rotor shell 10 for contact with the end plates 52 to more effectively maintain separation of the fluids.

A packed mass of suitable catalytic material 22 in the form of pellets, Raschig rings or other discrete material is poured into the top of each cell through openings 36. The openings are adapted to be supplied by fillers 38 which extend through the housing at the top of the rotor in alignment with each annular bank of cells. Other openings at the bottom of each cell are provided with closure members 44 hinged or otherwise removably secured to the ends of their respective cells to permit the catalytic material contained therein to be released and to descend to the hopper 40 where it may be removed from the apparatus. Access to the closure members 44 may be obtained by removal of closure member 56 in the bottom of hopper 40.

In operation each of the cells 22 is first filled with suitable catalytically active material, and the motor and gearing arrangement 18 is in turn activated to rotate the rotor either continuously or intermittently about its axis in accordance with a predetermined plan of operation.

As the rotor rotates about its axis, the cells of catalytic material are alternately positioned in the path of the reactant gas and then in the path of the purging fluid in order that a portion of the catalytic mass may be continuously contacted by each fluid. Thus after the catalytic material has become fouled by contact with the reactant fluid it is rotated out of the reactant fluid into a steam of purging fluid where it is cleansed of its impurities so that its catalytic efficiency is restored.

After a period of alternating reaction and regeneration that may range from a few seconds time to a prolonged period, the catalyst may become contaminated to the degree that normal purging is ineffective and the catalytic capability of the catalyst may no longer be restored in the usual manner. When such a condition obtains, rotation of the rotor is terminated, the flow of purging gas to the reactor is terminated and the closure member 56 is removed from the hopper 40. The opening thus provided permits access to the closures 44 at the lower end of each upright cell. Upon removal of a closure 44, the fouled catalyst in the supra-adjacent cell will fall by gravity into the hopper 40 where it may be completely removed from the apparatus. After removal of the fouled catalyst, a new or completely rejuvenated catalyst may be admitted through supply means 38 at the top of the housing, and normal operation may be restored.

In actual practice it may never be practicable to permit the catalyst to become so fouled that it becomes inoperative or even nearly so, and a system of periodic replacement of the catalytic material may be effected before its operating efficiency has been drastically reduced.

Used catalytic material removed from the cells of the rotor may be processed completely to remove all traces of contamination therefrom before it is reintroduced into the cells of the reactor and used in the usual manner.

While this invention has been described with reference to the embodiment illustrated in the drawing, it is evident that various changes may be made without departing from the spirit of the invention, and it is intended that all matter contained in the above description or shown in the accompanying drawings shall be interpreted as illustrative and not in a limiting sense.

I claim:

1. Apparatus for catalytic conversion having a cylindrical shell, radial partitions arranged to divide the shell into a series of sectorial compartments, means at opposite ends of the shell arranged to provide inlet and outlet ducts for a reaction fluid and a purging fluid, axially extending element cells having radially spaced sides of foraminous material disposed in the sectorial compartments in radially spaced relation to provide axial passages intermediate the spaced cells, baffle members in said passages extending diagonally between opposite ends of radially spaced cells to direct fluid material to and from the cells, means placing spaced element cells alternately in contact with the reaction fluid and the purging fluid, a mass of discrete catalytic material carried in each cell of the rotor, and means lying in the inlet and outlet ducts for the purging fluid at opposite ends of said apparatus for supplying the catalytic material to and for removing it from said element cells.

2. Apparatus for catalytic conversion as defined in claim 1 wherein the means for removing the catalytic material from the element cells comprises a removable closure for an opening in the bottom of each cell.

3. Apparatus for catalytic conversion as defined in claim 2 including a hopper in the outlet duct for the purging fluid arranged to receive the catalytic material as it is released from the element cells.

4. Apparatus for catalytic conversion having an upright rotor including a central rotor post, an annular rotor shell arranged concentrically about the rotor post, radial partitions extending between the rotor post and rotor shell to form a series of sectorial compartments therebetween, a housing surrounding the rotor having inlet and outlet ducts at opposite ends thereof for a reaction fluid and a purging fluid, vertically disposed element cells having radially spaced sides of foraminous material disposed in the compartments of the rotor in radially spaced relation to provide axial passageways intermediate the spaced cells, baffle means extending diagonally between opposite ends of radially spaced cells to direct fluid to and from the element cells, a mass of catalytic material in discrete form carried within each cell of the rotor, means at the lower end of the housing for withdrawing fouled catalytic material from certain of said cells, and means at the upper end of the housing for supplying catalytic material to the emptied cells while the reaction fluid is directed through catalytic material in circumferentially spaced cells of the rotor.

References Cited by the Examiner
UNITED STATES PATENTS

| | | |
|---|---|---|
| 2,617,986 | 11/1952 | Miller. |
| 2,835,560 | 5/1958 | Bason et al. _____ 23—288 |
| 2,934,495 | 4/1960 | Worth _____ 252—416 X |

MORRIS O. WOLK, *Primary Examiner.*